(12) United States Patent
Wang et al.

(10) Patent No.: US 8,065,728 B2
(45) Date of Patent: Nov. 22, 2011

(54) MALWARE PREVENTION SYSTEM MONITORING KERNEL EVENTS

(75) Inventors: Hao Wang, Madison, WI (US); Somesh Jha, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1107 days.

(21) Appl. No.: 11/852,567

(22) Filed: Sep. 10, 2007

(65) Prior Publication Data

US 2009/0070878 A1    Mar. 12, 2009

(51) Int. Cl.
 *G06F 11/00* (2006.01)
 *H04L 29/06* (2006.01)
 *H04L 9/00* (2006.01)
 *G06F 21/00* (2006.01)
 *G06F 21/22* (2006.01)
 *G06F 12/14* (2006.01)

(52) U.S. Cl. ............... 726/22; 726/23; 726/24; 713/164

(58) Field of Classification Search ............... 726/22, 726/23, 24; 713/164
See application file for complete search history.

(56) References Cited

U.S. PATENT DOCUMENTS

| | | |
|---|---|---|
| 2005/0028002 A1 | 2/2005 | Christodorescu |
| 2006/0143707 A1 | 6/2006 | Song et al. |
| 2006/0212942 A1 | 9/2006 | Barford et al. |
| 2006/0254906 A1 | 11/2006 | Numata et al. |
| 2007/0067841 A1 | 3/2007 | Yegneswaran et al. |
| 2007/0107052 A1* | 5/2007 | Cangini et al. ............ 726/22 |
| 2007/0240212 A1* | 10/2007 | Matalytski ............ 726/22 |
| 2008/0016339 A1* | 1/2008 | Shukla ............ 713/164 |
| 2008/0034429 A1* | 2/2008 | Schneider ............ 726/23 |

FOREIGN PATENT DOCUMENTS

| | | | |
|---|---|---|---|
| EP | 1655682 A2 | * | 5/2006 |
| KR | 10-0645983 B1 | | 11/2006 |

OTHER PUBLICATIONS

Najwa Aaraj, Anand Raghunathan, Niraj K. Jha; "A framework for defending embedded systems against software attacks"; Apr. 2011; Transactions on Embedded Computing Systems (TECS), vol. 10 Issue 3; Publisher: ACM, pp. 1-33.*
Lee, Sang Hun, Korean Search Report for PCT Application No. PCT/US2008/075243, Korean Intellectual Property Office, Mar. 31, 2009, Seogu, Daejeon, Republic of Korea.
Wang, Hao, et al., NetSpy: Automatic Generation of Spyware Signatures for NIDS, Proceedings of the 22$^{nd}$ Annual Computer Security Applications Conference, 2006, IEEE Computer Society, New York, New York.
Kirda, Engin, et al., Behavior-based Spyware Detection, Proceedings of the 5$^{th}$ USENIX Security Symposium, Aug. 2006, USENIX Association, Berkeley, California.

* cited by examiner

*Primary Examiner* — Eleni Shiferaw
*Assistant Examiner* — Courtney Fields
(74) *Attorney, Agent, or Firm* — Boyle Fredrickson, S.C.

(57) ABSTRACT

A malware prevention system monitors kernel level events of the operating system and applies user programmable or preprepared policies to those events to detect and block malware.

16 Claims, 2 Drawing Sheets

MALWARE PREVENTION SYSTEM MONITORING KERNEL EVENTS

STATEMENT REGARDING FEDERALLY SPONSORED RESEARCH OR DEVELOPMENT

This invention was made with United States government support awarded by the following agencies:
DOE W-7405-ENG-36
NSF 0524051
The United States has certain rights to this invention.

CROSS-REFERENCE TO RELATED APPLICATIONS

Not Applicable.

BACKGROUND OF THE INVENTION

The present invention relates to computer programs for detecting malicious programs such as spyware and the like.

Malicious programs or "malware" have become a significant problem in the computer industry. Examples of such malware include: "viruses" which are programs attached to documents or other programs and that activate themselves within a host computer to self-replicate for further spreading; "worms" which are programs that self-replicate to transmit themselves across a network; "Trojans" or "Trojan horses" which are programs that masquerade as useful programs but contain portions to attack the host computer or leak data; "back doors" which are programs that open a system to external entities by subverting local security measures; and "spyware" which are programs that transmit private-user data to an external entity. More generally malware is malicious software intentionally included or inserted in a system for a harmful purpose.

Spyware, in particular, has become a significant security threat. Some studies have suggested that as many as 69% of the computers connected to the Internet have been infected with spyware at some point in time. The damages caused by spyware (e.g. stolen credit card numbers) are not limited to disruption of the infected computer system, yet unlike some other types of malware, spyware may not noticeably degrade the performance of the computer.

Methods for detecting malicious programs may be classified as dynamic or static. In dynamic methods, the suspected program is executed in a "sandbox". A sandbox is a safe execution area created in a computer that uses hardware and/or software to prevent the executing program from damaging interaction with the computer. During execution of the malware in the sandbox, attempts by the malware to interact with the computer, such as by writing data outside of a predefined memory area, are monitored. The constraints placed on the sandbox make it an impractical environment for the execution of normal programs, and this technique is normally used off-line for research purposes.

Static detection does not require execution of the suspected program, but instead reads and analyzes the program instructions or "code" before it is executed. One "heuristic" detection technique looks for changes in certain program locations (normally the beginning and end of the code) where the virus is likely to be attached. A second "signature" detection technique checks for known virus-specific sequences of instructions (virus signatures) inside the program. Such signature detection is effective when the virus does not change significantly over time and when multiple viruses have the same signature.

Most malware detection and prevention systems intended for real-time defense of an operating computer use a signature detection system performing a background scanning of files to detect signatures of known malware. This signature-based solution has two major shortcomings. First it is ineffective against novel malware for which no signature has been developed. Second, it is ineffective against known malware that has been modified with minor changes ("obfuscation)" which can defeat the signature scanning technique.

BRIEF SUMMARY OF THE INVENTION

The present inventors have recognized that much malware and specifically spyware can be detected by monitoring kernel events generated by the operating system in response to the malware's execution. These events, which are essential to the function of the malware, are not easily disguised. Different sequences of events associated with different malware can be captured in a set of policies written in a general policy language. The policies may block selected kernel events to prevent execution of the malware after it has been detected. By monitoring and controlling kernel events within the operating system, the invention is protected against being disabled by the malware and may operate in real time with very low overhead.

Specifically, the present invention provides a computer program executable on a computer running an operating system and executing benign and possible, unrecognized malware processes. The computer program works with or as part of the operating system to monitor kernel events of the operating system associated with all processes executing on the computer. The monitored kernel events are evaluated against stored policies describing sequences of kernel events associated with malware, and the program stops execution of at least some processes that are associated with kernel events identified by a stored policy as being malware.

It is thus a feature of one embodiment of the invention to identify malware based not on the malware code itself but on the kernel level events generated by the malware. By monitoring low level events, early and reliable detection of the malware is possible. Further the technique may be simply integrated into a running computer with little loss in the performance of the computer The monitoring step may be performed before the kernel event is committed to a system resource and the stopping of the process may be done by blocking at least one of the kernel events associated with the process.

It is thus a feature of one embodiment of the invention to provide a simple mechanism for terminating malware behavior. By trapping the event, the malicious behavior is averted with minimal disruption to other programs including, for instance, a partially benign program having some spyware features that the user may wish to disable.

The computer program may be implemented within the operating system kernel.

It is thus another feature of one embodiment of the invention to provide a malware solution that is both better resistant to disabling by malware (as it resides in the kernel) and that may be executed in real time using an actual fully functional operating system.

The computer program may be implemented as a driver in the Windows operating system.

It is thus another feature of one embodiment of the invention to provide a solution that is applicable to the widely used Windows operating system where access to the code of the underlying kernel is not available to the public.

The computer program may be implemented as a dynamically linked library in the Windows operating system.

It is thus another feature of one embodiment of the invention to provide a program that may be quickly implemented on a Windows-type computer without modification or recompiling of the Windows kernel.

The evaluation step may include the step of mapping low level kernel events to higher-level events, the latter described by the stored policies.

It is thus another feature of one embodiment of the invention to derive high-level (and universal) operating system functions from kernel level events that may individually be ambiguous as to function or unique to a particular operating system.

The stored policies may accept as arguments the monitored kernel events as well as stored states derived from previous kernel events.

It is thus another feature of one embodiment of the invention to provide a policy structure that is sensitive to historical state and thus which may detect malware operating over a long time period.

The kernel events may identify functions selected from the group consisting of: creation of a process, termination of a process, opening of a file, closing of a file, opening of a network socket, and closing of a network socket.

It is thus a feature of one embodiment of the invention to provide a malware detection system that may flexibly combine core kernel level functions.

The stored policy may identify as malware a file created by a given process and then subsequently executed by the same given process.

It is thus a feature of one embodiment of the invention to provide a system that may detect the common malware exploit of a "drive-by download".

The policies may be limited in application to identified predicate processes.

It is thus a feature of one embodiment of the invention to be able to tailor the detection process to the particular application being run.

The policies may be applicable to child processes of the identified predicate processes.

It is thus a feature of one embodiment of the invention to allow the policies to track processes created by a given predicate process.

The policies may be authored in a policy language linking kernel events with actions where the actions include stopping a kernel event or allowing the kernel event to proceed. In addition, the actions may further include storing the kernel event in a state database and the policy language may link kernel events in the state database with other kernel level events. One action may be logging the kernel event with a time stamp.

It is thus a feature of one embodiment of the invention to provide a flexible policy language that may capture a variety of malware identifying functions.

These particular features and advantages may apply to only some embodiments falling within the claims and thus do not define the scope of the invention.

DETAILED DESCRIPTION OF THE INVENTION

Figure 1:
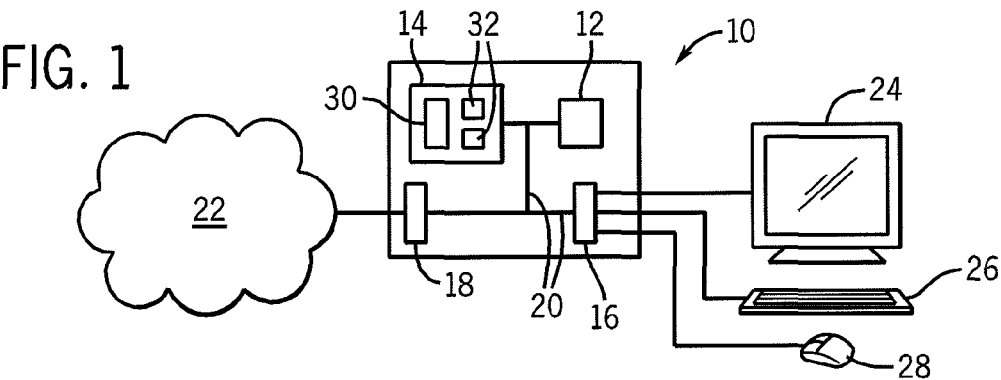
FIG. 1 is a simplified block diagram of a desktop computer suitable for use with the present invention to execute an operating system and associated application programs.

Referring now to FIG. 1, a typical computer system 10 suitable for use with the present invention may provide a processor 12 communicating with a memory 14 and with interfaces 16 and 18 via an internal bus 20.

Interface 16 may provide for connections to a display monitor 24 and one or more input devices including keyboard 26 and cursor control device 28 such as a mouse. Interface 18, for example, may be a standard Ethernet interface communicating with the Internet 22. Such a computer system 10 represents a typical personal computer of a type well known in the art.

Figure 2:
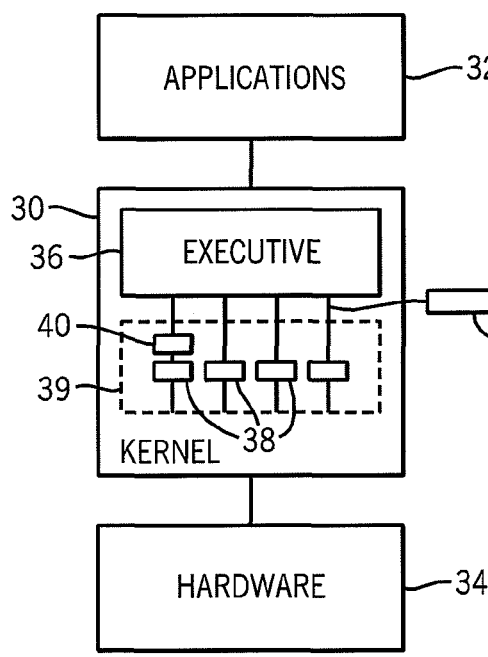
FIG. 2 is a block diagram of the operating system of FIG. 1 showing integration of the present invention with that operating system as a driver.

Referring now to FIGS. 1 and 2, the memory 14 of the computer system 10 may hold an operating system kernel 30, for example, the Windows operating system manufactured by Microsoft of Redmond Calif. As is generally understood in the art, the kernel 30 is a computer program that provides an interface between the hardware 34 of the computer system 10 and one or more application programs 32, for example, a word processor or a browser program, running on the computer system 10.

The kernel 30 includes an executive portion 36, which in the Windows operating system manages basic I/O, memory and the execution of a variety of processes (actual execution of a program's instructions) on the computer system 10. The executive portion 36 communicates with the hardware through a set of drivers 38 and 40 which form part of a "hardware abstraction layer" 39 allowing one version of the kernel 30 (and hence one version of the application programs 32) to work interchangeably with a variety of hardware configurations.

Drivers 38 and 40 are programs often written by third-parties that may be integrated into the kernel 30. Commonly this integration is done at run time through the use of linked libraries holding the drivers, termed "dynamically linked libraries" or DLL's in the Windows operating system. The lower level drivers 38 provide for a common software interface to unique hardware elements (for example a video card). Windows also allows for higher level non-device drivers termed "filter drivers" 40 positioned above the lower level drivers 38.

The executive portion 36 communicates with the drivers 40 and 38 through a set of operating system messages termed: "kernel events" 42 that pass instructions and data among various components of the kernel 30. The filter drivers 40 are positioned to receive kernel events 42 before the lower level drivers 38 and may modify or terminate a kernel event 42 before it is received by other drivers 38. The filter drivers 40 provide the present invention with access to kernel event 42.

Figure 3:
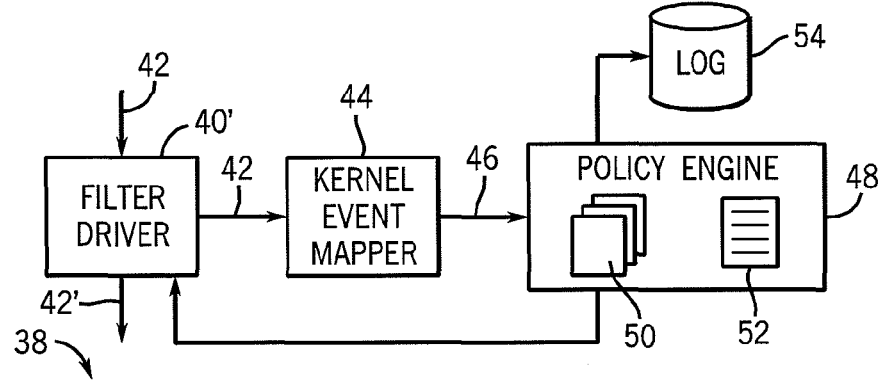
FIG. 3 is a block diagram of the program of the present invention receiving kernel level events from the operating system and mapping the kernel level events to higher-level events applied to policies stored in a policy engine.
Figure 4:
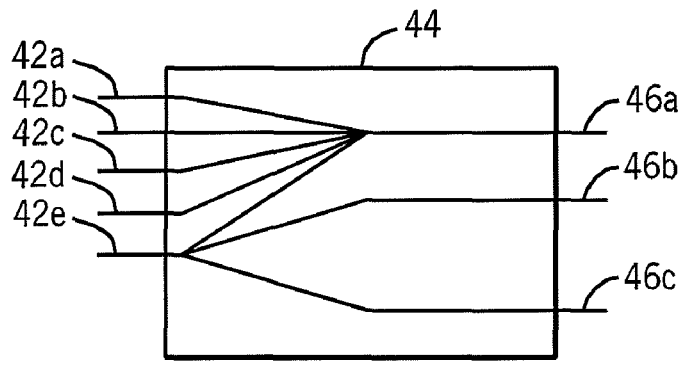
FIG. 4 is a schematic representation of the mapping process of FIG. 3 converting low-level kernel level events into higher level events described by policies of the policy engine.

Referring now to FIG. 3, the present invention employs a filter driver 40' (that is a program written to conform with the requirements of a filter driver for the operating system) receiving kernel events 42 and optionally passing those kernel events 42' to other drivers 38. The filter driver 40' may be a DLL and thus dynamically linked to the operating system to operate logically within the kernel 30 as shown in FIG. 2.

The filter driver 40' may incorporate or communicate with a kernel event mapper 44 which takes kernel events 42 and maps them to high-level events 46. These high-level events 46 are then provided to a policy engine 48 which holds a set of policies 50, as will be described below, which analyze the high-level events 46 to determine whether they reflect possible activity of malware. The policy engine 48 includes a state table 52 that will be used to allow the policies 50 to react to historical high-level events 46. Depending on the particular instructions of the policies 50, the policy engine 48 may load the high-level events 46 or kernel events 42 in a log file 54 providing a chronological, time-stamped event log of the events as they are received.

Referring now to FIG. 3, the kernel event mapper 44 may receive different kernel events 42a-42d and map them to a single high-level event 46a. Alternatively a single kernel event 42e (depending on its arguments) may map to different high-level events 46b and 46c.

For example, a high-level event 46a may be "Delete a file" expressed as follows:

DeleteFile (filename, pid)

indicating that a file having "filename" is to be deleted as requested by a process having a process identification number "pid", a unique number assigned to the process creating the file by the operating system. Here the high-level event 46a is mapped from any of multiple kernel events 42a-d of:

IRP_MJ_SET_INFORMATION (filename, pid, IRP, Device)

or

IRP_MJ_CLEANUP (filename, pid, IRP, Device)

or

IRP_MJ_CREATE (option, filename, pid, IRP, Device)

If the low-level kernel event 42 is IRP_MJ_SET_INFORMATION and the "IRP" parameter is "FileDispositionInformation" and the file is marked for deletion, then this low-level event is a DeleteFile; otherwise it is not. Similarly, if the low-level kernel event 42 is IRP_MJ_CLEANUP and the "IRP" parameter is "DeletePending" or "DeleteOnClose", then this is also a high-level DeleteFile event.

An example high-level event 46c mapped from a single kernel level event 42e may be "Creating a new file". Such an event might be expressed as follows:

CreateFile (filename, filehandle, pid)

where "CreateFile" is the name of the high-level event 46, and "filename", "filehandle", and "pid" are parameters (arguments) of the high-level event 46c in which "filename" is the name of the file that is to be created, "filehandle" is a unique identifier created by the operating system (OS) to track open files, and "pid" is the process identification number. "filehandle" is obtained through the "IRP" parameter of the call IRP_MJ_CREATE. This high-level event 46c (CreateFile (filename, filehandle, pid)) may be mapped from a single kernel event 42e:

IRP_MJ_CREATE (option, filename, pid, IRP, Device)

where the parameters of CreateFile are simply the corresponding parameters of the kernel level event IRP_MJ_CREATE and this mapping occurs when the "option" parameter is "Overwrite", or "Create". If the "option" parameter is "Open", or "Open If", then this low-level kernel event 42e maps to a different high-level event 46b of OpenFile.

By remapping the kernel events 42 as high-level events 46 the complexity of the policy 50 is greatly reduced and the policies 50 be made platform independent.

Each policy 50 is written from policy instructions linking events, predicates, actions, and states. The policy language may best be understood by reference to an example policy for detecting a drive-by download, that is, a situation where an element of malware installed on the computer downloads additional malicious programs from the Internet and then executes those programs. A policy 50 blocking a drive-by-download could be written per Example 1 as follows:

Example 1

```
1   Policy NoDriveByDownload : [iexplore.exe, firefox.exe]
2           Event CreateFile(filename, handle, pid)
3                   FileState.Map(filename, pid);
4                   Return ALLOW;
5           EndEvent;
6       Event CreateProcess(filename, pid, parentPid)
7               if (FileState.GetOwner(filename) == parentPid) then
8                   LOG
9                   Return DENY;
10              end
11  EndEvent;
```

Line 1 of this policy provides an instruction that marks the beginning of the policy 50 and designates its name "NoDriveByDownload" followed by predicate processes, in this case Internet Explorer or Firefox, two well-known Internet browsers, to which this policy will apply. If no predicate processes are designated, the policy will apply to all processes.

Line 2 is an event instruction that responds to the high-level event 46 "CreateFile", the operating system event that will create a file, for example, on a disk drive. This high-level event 46 carries with it parameters: "filename", "filehandle", and "pid" that may be used by the rest of the process. At line 3, this high-level event 46 is stored in the state table 52 for reference by this or future policies. The instruction at line 4 then provides an action which allows the underlying kernel events 42 to be passed to other drivers 38 of the operating system as indicated by kernel event 42' of FIG. 3. Line 5 marks the end of that event instruction begun at line 2.

This policy 50 also includes a second event instruction at line 6 triggered by a CreateProcess high-level event 46, that is, an event that starts a new process executing under the operating system. At line 7, the state table 52 is interrogated to identify the process that created (loaded) the executable file that will now be started in the CreateProcess event. In a drive-by downloading attack, the process associated with this filename will have been previously stored in the state table 52 at line 3 of the NoDriveByDownload policy.

If the process trying to execute the file (in the CreateProcess event) is the same process that created the process to be executed (in the CreateFile event) then, at line 7, an interrogation of the state table 52 and test will indicate a drive-by-download and the policy will log this information in the log file 54 (typically logging high-level event 46 and a timestamp but possibly logging kernel events 42) denying the kernel event 42 underlying the CreateProcess high-level event 46. This Deny action may simply block the kernel event 42 from other drivers 38 effectively preventing the process creation. Lines 10 and 11 end the second event instruction and the policy respectively.

Figure 5:
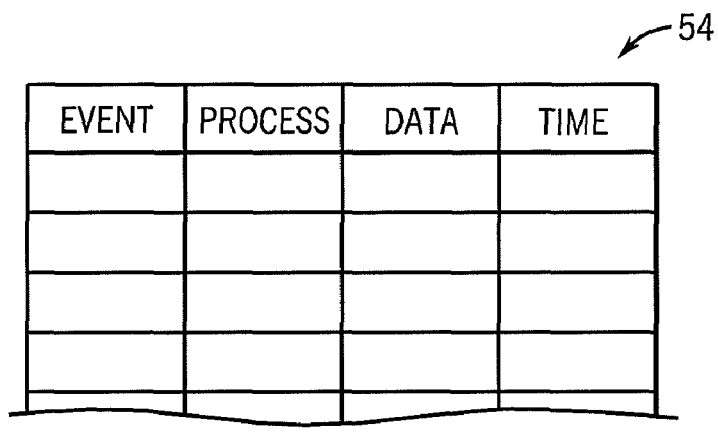
FIG. 5 is a simplified representation of a state table used in the present invention for preserving states utilized by the policies.

Referring to FIG. 5, generally the logging process (of line 8 above) builds a log file 54 providing a set of logical rows associated with a timestamp (the fourth column) and recording the logged high-level event 46 (in the first column), its parent process (in the second column) and any parameter data (in the third column). This log file 54 may be used for forensic analysis of the operation of the malware and to generate new policies.

The following Table 1 shows the wide variety of different high-level events 46 that may form the basis of the instructions of policies 50. As can be seen, the event types cover core operating system activities such as managing files, opening and closing network sockets, starting and stopping processes that are being executed, and managing the system registry.

TABLE 1

| Event Type | Event Name | Arguments | Description |
| --- | --- | --- | --- |
| File | OpenFile | {filename, handle, pid} | Open a file |
|  | CloseFile | {handle, pid} | Close a file |
|  | CreateFile | {filename, handle, pid} | Create a file |
|  | DeleteFile | {filename, pid} | Delete a file |
|  | RenameFile | {oldfile, newfile, handle, pid} | Rename a file |
| Network | ReadFile | {handle, pid} | Read from a file |
|  | WriteFile | {handle, pid} | Write to a file |
|  | OpenSocket | {socket, pid} | Open a network socket |
|  | CloseSocket | {socket, pid} | Close a network socket |
|  | Connect | {socket, address, pid} | Connect to an address |
|  | Disconnect | {socket, pid} | Disconnect |
|  | Send | {socket, data, pid} | Send data |
|  | Receive | {socket, data, pid} | Receive data |
|  | Listen | {socket, pid} | Listening on a handle |
| Process | CreateProcess | {filename, pid, parentPid} | Create a process |
|  | TerminateProcess | {pid} | Terminate a process |
|  | LoadImage | {pid, imagePath} | Load code (e.g., a DLL) |
| Registry | OpenRegKey | {key, pid} | Open a registry key |
|  | CloseRegKey | {key, pid} | Close a registry key |
|  | CreateRegKey | {key, pid} | Create a registry key |
|  | DeleteRegKey | {key, pid} | Delete a registry key |
|  | CreateRegValue | {key, value, data, pid} | Create a key value |
|  | DeleteRegValue | {key, value, pid} | Delete a key value |
|  | SetRegValue | {key, value, data, pid} | Change a value |

The following Table 2 shows the different types of actions that may be implemented by policy 50 in response to events and states:

TABLE 2

| Action Type | Actions | Description |
| --- | --- | --- |
| Enforcement | ALLOW | Allow an event to proceed |
|  | DENY | Stop an event |
| Logging | LOG | Log the event |
| Policy State (Update) | FileState.Map(pathname, pid) | Map a file to the process that created it |
|  | FileState.Unmap(pathname) | Unmap a file from the FileState |
|  | NetworkState.Map(socket, address) | Map a socket to an address |
|  | NetworkState.Unmap(socket) | Remove a socket from the mapping |
|  | ProcessState.Map(pid, pathname) | Map a process id to its binary image |
|  | ProcessState.Unmap(pid) | Unmap a process |
|  | ProcessState.AddWhiteList(pid) | Add a process to the white list |
|  | ProcessState.RemoveWhiteList(pid) | Remove a process from the white list |
|  | ProcessState.AddBlackList(pid) | Add a process to the black list |
|  | ProcessState.RemoveBlackList(pid) | Remove a process from the black list |
| Policy State (Query) | FileState.GetOwner(pathname) | Return the owner process PID for a file |
|  | NetworkState.GetAddress(socket) | Return the remote address associated with the socket |
|  | ProcessState.InWhiteList(pid) | Check to see if a process is in the white list |
|  | ProcessState.InBlackList(pid) | Check to see if a process is in the black list |
|  | ProcessState.IsFamily(pid1, pid2) | Check to see if two processes belong to the same process tree |

As can be seen, generally the policy instructions support three types of actions: enforcement, logging and state maintenance. Enforcement actions DENY or ALLOW a particular event. The DENY action directly affects the proper execution of a monitored process. For a CreateProcess event, a DENY action will terminate the process. For other events, denying means the request associated with the event is not committed to the resource.

Logging actions indicate whether to log (LOG) the intercepted event in the log file 54.

State actions store information in the state table 52 and can be divided into two groups: Update and Query. Update actions update the state table 52 while Query actions retrieve information from the state table 52.

The flexibility of the policy system which allows the user to write policies 50 or to use prewritten policies to address a variety of malware situations may be illustrated in the additional following examples.

Example 2 shows a policy to block Trojan horses (Trojans). In this case, because it is not known what process might spawn Trojan behavior, no predicate processes are provided. This policy is generally very similar to the NoDriveByDownload policy described above, with the exception of lines 3 and 4 which check to see if a process is attempting to create a file in the Windows system directory and the process is not contained in a "white list" of processes that should be creating files in the Windows system directory. At lines 11-13 an attempt to set a registry value triggers a check to see if the data to be set is owned by the same process or a process in the same family as the process as doing the setting and if the registry key is in a list of sensitive registry keys. If so, the setting of the registry is denied.

Example 2

```
1   Policy NoTrojans
2       Event CreateFile(filename, filehandle, pid)
3           if RegMatch(filename, "C:\Windows\*")
                AND !Process.InWhiteList(pid) then
4               Return DENY;
5           else
6               FileState.Map(filename, pid);
7               Return ALLOW;
8           end
9       EndEvent
10      Event SetRegValue(key, value, data, pid)
11          owner = FileState.GetOwner(data);
12          if (ProcessState.IsFamily(owner, pid) AND
13              Match(key, SensitiveRegKey))" then
14              LOG;
15              Return DENY;
16          end
17      EndEvent
```

Example 3 shows a different policy that disables an objectionable spyware feature of a program, for example, a music playing program (MusicPlayer), that is otherwise desirable for the purpose of playing music. In lines 2-5, any process that opens a particular type of file (in this case an MP3 file) is placed on a blacklist based on the suspicion that MusicPlayer is logging information about a user's private music choices. At lines 8-11, the blacklist created at lines 3-5 is employed to prevent data from being sent by MusicPlayer to a remote location. It should be noted that blocking the registry modification does not block the beneficial playing of the music file by the MusicPlayer program.

Example 3

```
1   Policy MusicPlayer: [musicplay.exe]
2       Event Openfile(filename, filehandle, pid)
3           if RegMatch(filename, "*.mp3") then
4               ProcessState.AddBlackList(pid);
5               Return ALLOW;
6           end
7       EndEvent;
8       Event Send(socket, pid)
9           if ProcessState. InBlackList(pid) then
10              Return DENY;
11          end
12      EndEvent
```

Figure 6:
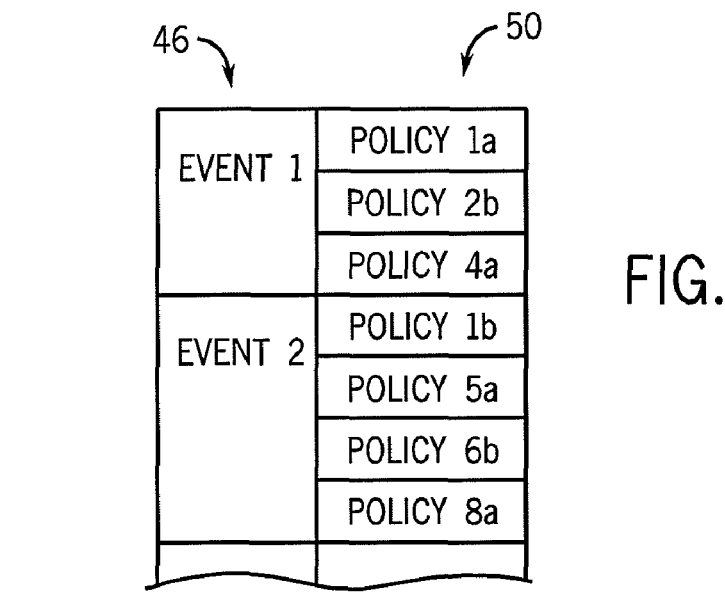
FIG. 6 is a simplified representation of the storage of the policies in the policy engine for rapid access.

Referring now to FIG. 6, event instructions of each policy 50 may be sorted according to the high-level events 46 they are triggered by, the latter which may serve as an index to affected policies 50. In this way, as high-level events 46 are detected, they may rapidly be matched to the relevant policies 50 in real time with very little resource consumption in terms of processor bandwidth.

While the present invention has been described with respect to the Windows operating system, it will be understood that these techniques may be even more easily apply to open source operating systems such as Linux that permit programs to be written to monitor and modify kernel level events or that allow the operating system to be modified to implement the procedures of the present invention.

The present invention contemplates that it will be used on a standard operating system running on an individual standalone computer. Nevertheless it will be understood that the invention may also be applicable to operating systems operating in a virtualization environment either as implemented in the operating system or the virtualization operating system.

The present invention has been described in terms of the preferred embodiment, and it is recognized that equivalents, alternatives, and modifications, aside from those expressly stated, are possible and within the scope of the appending claims.

We claim:

1. An electronic computer using an operating system adapted to run benign processes, the electronic computer further executing a stored program to:
   (a) monitor kernel events of the operating system associated with processes executing on the computer using at least one driver executed by the operating system to provide a reporting of kernel events by the operating system;
   (b) evaluate the monitored kernel events against predefined stored policies describing sequences of kernel events associated with malware wherein the stored policies accept as arguments the monitored kernel events and stored states derived from previous kernel events, the evaluation indicating possible activity by malware when the sequences of kernel events of the policy matches monitored kernel event; and
   (c) block execution of at least one process associated with kernel events identified by a stored policy as indicating malware.

2. The electronic computer of claim 1 wherein the monitoring of step (a) is performed before the kernel event is committed to a system resource and wherein the blocking of the execution of the at least one process terminates a kernel event associated with the at least one process.

3. The electronic computer of claim 1 wherein the stored program is implemented within the operating system.

4. The electronic computer of claim 1 wherein the stored program is implemented as a dynamically linked library in the Windows operating system.

5. The electronic computer of claim 1 wherein the evaluation of step (b) includes the step of mapping low level-kernel events to higher-level events described by the stored policies.

6. The electronic computer of claim 1 wherein the kernel events may identify functions selected from the group consisting of: creation of a process, termination of a process, opening of a file, closing of a file, opening of a network socket, closing of the network socket.

7. The electronic computer of claim 1 wherein at least one stored policy identifies as malware a file created by a given process and then subsequently executed by the given process.

8. The electronic computer of claim 1 wherein the policies may be limited in application to identified predicate processes.

9. The electronic computer of claim 8 wherein the policies are applicable to child processes of the identified predicate processes.

10. The electronic computer of claim 1 wherein the policies are authored in a policy language linking kernel events with actions where the actions include stopping a kernel event or allowing the kernel event to proceed.

11. The electronic computer of claim 10 wherein the actions further include storing the kernel event in a state database and the policy language links kernel events in the state database with actions.

12. The electronic computer of claim 10 wherein the actions further include logging the kernel event with a time stamp.

13. The electronic computer of claim 1 wherein the stored policies are held in a file updatable by a user.

14. A computer system comprising:
    at least one processor communicating with resources including computer memory;
    an operating system program stored in the memory and executing on the processor;
    one or more application programs stored in memory and executing on the processor under control of the operating system;
    wherein the operating system operates to:
    (a) monitor kernel events associated with processes executing on the computer using at least one dynamically linked program called by the operating system to cause the operating system to report kernel events;
    (b) evaluate the monitored kernel events against predefined stored policies describing sequences of kernel events associated with malware wherein the stored policies identify high level events as a function of multiple kernel events at different times, the evaluation indicating possible activity by malware when the sequence of kernel events of the policy matches monitored multiple kernel events; and
    (c) block execution of a process associated with kernel events identified by a stored policy as associated with malware.

15. An electronic computer executing at least one stored program to:
    (a) monitor kernel events of an operating system associated with processes executing on the computer using at least one driver used by the operating system to report kernel events;
    (b) evaluate the monitored kernel events against predefined stored policies composed in a human readable policy language describing sequences of kernel events of different times associated with an instance of malware and actions in response to the sequences of kernel events, the evaluation indicating possible activity by malware when the sequence of kernel events of the policy matches a monitored sequences of kernel events; and
    (c) execute an action of the policy language to block execution of at least one process associated with kernel events identified by a stored policy as indicating malware.

16. A method of detecting malware on an electronic computer having an operating system with an operating system kernel managing the execution of multiple processes including benign processes and inadvertent malware processes, the method comprising the steps of:
    (a) monitoring operating system kernel events associated with processes executing on the computer using at least one driver used by the operating system to report kernel events;
    (b) evaluate the monitored kernel events against predefined stored policies describing sequences of events associated with malware wherein the stored policies accept as arguments the monitored kernel events and stored states derived from previous kernel events, the evaluation indicating possible activity by malware when a sequences of events of a policy matches monitored kernel events; and
    (c) block execution of a process associated with kernel events identified by a stored policy as associated with malware.

* * * * *